(12) United States Patent
Kadonaga et al.

(10) Patent No.: US 6,649,665 B2
(45) Date of Patent: Nov. 18, 2003

(54) METHOD FOR PRODUCTION OF POROUS CROSS-LINKED POLYMER MATERIAL

(75) Inventors: Kenji Kadonaga, Takatsuki (JP); Akiko Mitsuhashi, Sanda (JP); Kazutomo Takahashi, Moriyama (JP)

(73) Assignees: Nippon Shokubai Co., Ltd., Osaka (JP); The Proctor & Gamble Company, West Chester, OH (US)

( * ) Notice: Subject to any disclaimer, the term of this patent is extended or adjusted under 35 U.S.C. 154(b) by 0 days.

(21) Appl. No.: 10/149,663

(22) PCT Filed: Oct. 23, 2001

(86) PCT No.: PCT/JP01/09298

§ 371 (c)(1),
(2), (4) Date: Jun. 13, 2002

(87) PCT Pub. No.: WO02/40546

PCT Pub. Date: May 23, 2002

(65) Prior Publication Data

US 2003/0139482 A1 Jul. 24, 2003

(30) Foreign Application Priority Data

Nov. 15, 2000 (JP) ........................................ 2000-347962

(51) Int. Cl.⁷ .................................................. C08J 9/28
(52) U.S. Cl. ............................................ 521/64; 521/63
(58) Field of Search ....................................... 521/63, 64

(56) References Cited

U.S. PATENT DOCUMENTS 5,334,621 A * 8/1994 Beshouri

FOREIGN PATENT DOCUMENTS

| WO | WO 93/04092 | 3/1993 | ............. C08F/2/32 |
| WO | WO 93/07092 | 3/1993 | |
| WO | WO 97/45456 | 12/1997 | ............. C08F/2/32 |
| WO | wo 97/45479 | 12/1997 | ............. C08J/9/28 |

* cited by examiner

Primary Examiner—Morton Foelak
(74) Attorney, Agent, or Firm—Fish & Richardson P.C.

(57) ABSTRACT

In producing a porous cross-linked polymer by forming a water-in-oil type high internal phase emulsion and subsequently polymerizing the emulsion, a method for the production of a porous cross-linked polymer material which comprises a step of polymerizing a water-in-oil type high internal phase emulsion obtained in the presence of a polyglycerine fatty acid ester. This invention permits an HIPE to be polymerized at a high temperature for the purpose of stabilizing the HIPE and consequently warrants quick production of a porous cross-linked polymer material possessed of an excellent water absorbing property.

2 Claims, 1 Drawing Sheet

METHOD FOR PRODUCTION OF POROUS CROSS-LINKED POLYMER MATERIAL

TECHNICAL FIELD

This invention relates to a method for the production of a porous cross-linked polymer material by the use of a polyglycerine fatty acid ester as a surfactant.

BACKGROUND ART

As a technique for obtaining a porous substance formed of uniform open cells of a minute diameter, a method for obtaining the polymer in a water-in-oil type high internal phase emulsion (hereinafter referred to briefly as "HIPE") in the presence of a specific surfactant has been known. It is generally held that the term "high internal phase emulsion" as used herein means an emulsion in which the ratio of the internal phase to the total volume of the emulsion exceeds 70 vol. % [K. J. Lissant, Journal of Colloid and Interface Science, Vol. 22, 462 (1966)]. U.S. Pat. No. 5,334,621, for example, discloses a method for producing a porous material by cross-link polymerizing a polymerizing monomer contained in the HIPE (hereinafter referred to the "HIPE method").

This HIPE method produces a porous cross-linked polymer by preparing an HIPE containing (i) a polymerizing monomer mixture containing an oil-soluble vinyl monomer and a cross-linking monomer possessed of not less than two functional group in the molecular unit, (ii) a water phase accounting for 90 wt. %, preferably 95 wt. %, and particularly preferably 97 wt. % of the emulsion, (iii) a surfactant active agent such as a sorbitan fatty acid ester and a glycerol mono-fatty acid ester, and (iv) a polymerization initiator and heating the HIPE till it is polymerized and cross-linked. Generally, the porous cross-linked polymer is produced by mixing the oil phase containing at least the components (i) and (iii) mentioned above and the water phase, namely the component (ii), and emulsifying the resultant mixture thereby preparing an HIPE and adding an initiator, namely the component (iv), to the HIPE and, at the same time, heating them together to a temperature most suitable for the polymerization of the HIPE and initiating this polymerization. According to this HIPE method, since a porous material formed of open cells in a reticular pattern by a reversed-phase emulsion polymerization, the produced porous material is fated to acquire such characteristic properties as low density, water absorbing property, water retaining property, heat insulating property, and sound insulating property.

As a technique for preparing such an HIPE, the official gazette of WO97/45456, for example, discloses a method for preparing this HIPE by emulsification using at least one sorbitan fatty acid ester or sugar fatty acid ester with a view to stabilizing the HIPE. Though it has no mention of the temperature for the preparation of the HIPE, it has a statement to the effect that when the HIPE is in a stable range, it can be cured, namely polymerized, at a temperature in the range of 25–90° C. In fact, when sorbitan monolaurate and ditallow dimethyl ammonium chloride are used in combination, an HIPE is prepared by using a water phase at 40° C. and the HIPE is polymerized at 70° C. for 24 hours to produce a polymer material.

The official gazette of WO97/45479 discloses a method for preparing an HIPE by using an emulsifier system composed of an anionic surfactant possessed of an oleophilic moiety and an anion group and a quaternary salt possessed of a hydrocarbon group of not less than eight carbon atoms. Though it has no mention of the temperature for preparing the HIPE, it has a statement to the effect that the HIPE can be cured, namely polymerized, at least at a temperature of not less than 25° C.

The HIPE method, as described above, obtains a porous cross-linked polymer by emulsifying an oil phase containing at least one species of polymerizing monomer and a water phase by the use of an emulsifier such as a surfactant and then polymerizing the resultant HIPE by means of heating. Where this process is performed continuously, it is necessary for the purpose of exalting the efficiency of production to shorten the time for preparing an HIPE and the time for subsequently polymerizing the HIPE. Generally the HIPE is prepared in an emulsifying device and then the HIPE is polymerized in a polymerizing device. Where the polymerization of the HIPE is initiated by adding a polymerization initiator to the HIPE and subsequently heating the HIPE containing the polymerization initiator, therefore, the fact that the temperature of the HIPE in the emulsifying device and the polymerization temperature of the HIPE in the polymerizing device are approximated closely to each other is believed to bring the advantage of curtaining the time for initiating the polymerization of the HIPE.

Since the HIPE generally contains such a large amount of water that the water content thereof reaches a level in the range of 1,000–25,000 (v/v) %, however, it is extremely deficient in stability and is deprived of stability even by a slight increase of temperature. Normally, therefore, the practice of preparing an HIPE by emulsifying an oil phase containing in advance therein a polymerization initiator and a water phase at a temperature in the range of 25–40° C. has been in vogue. Such is the true state of affairs.

Further, when a porous cross-linked polymer is produced by polymerizing an HIPE, the charged raw materials possibly succumb to degeneration and consequently emit offensive odor. Since the degeneration of this sort depends particularly on temperature, it is naturally preferable to prepare the HIPE at a low temperature for the purpose of preventing the components used in the HIPE from generating to such degeneration. In consideration of the instability of the HIPE due to elevation of temperature as a contributory factor, the preparation of the HIPE inclusive of the preparation of the oil phase for the production of the HIPE and the preparation of the water phase is generally required to be carried out in the neighborhood of normal room temperature.

In this respect, the inventions disclosed in the official gazette of WO97/45456 and the official gazette of WO97/45479 have been aimed at stabilizing an HIPE and fulfilling the polymerization of an HIPE at a high temperature. The stabilization attained by the inventions does not deserve to be rated as fully satisfactory because their methods actually degrade the emulsifying power during the steps of emulsification and polymerization and induce separation of water. Particularly, the method taught in the official gazette of WO97/45456, when expected to attain the emulsification by using a water phase heated at a temperature higher than 40° C., has the possibility of degrading the HIPE in stability, entailing separation of a large amount of water during the course of emulsification or polymerization, and inducing the polymer material to suffer from degradation of performance.

The produced porous cross-linked polymer can be used as a sound insulating material or a heat insulating material for the purpose of absorbing sound or heat, as a chemical impregnating substrate for the purpose of imbibing an aromatic material or a detergent, and as an aborbing material for oil or organic solvent. It can also be used as a sanitary material as in disposable diapers or sanitary articles or as a cosmetic or medical material for applications not fated to create direct contact with the human system. In this case, the surface of the porous cross-linked material as a finished product is required to reduce the stimulus to the skin to the fullest possible extent for the purpose of preventing the user from forming skin rash or experiencing unpleasant feeling. When the charged raw materials are caused as by degeneration to emit offensive odor or produce stimulus, the offensive odor or the stimulus possibly persists in the product. An effort to remove it from the product gives rise to the necessity of fortifying the washing step. Since the HIPE inherently has a water content in the range of 1,000–25,000 (v/v) % and the preparation of the HIPE itself requires a large amount of water to be used, it is necessary to decrease the washing water to be used to the fullest possible extent. Particularly, the porous cross-linked polymer has a large surface area for contact with the ambient air and, therefore, requires a large amount of washing water to be thoroughly cleaned. This fact implies the disposal and expulsion of a large amount of waste water and brings such adverse effects as increasing the cost of production and augmenting the load on the environment.

DISCLOSURE OF THE INVENTION

The present inventor has pursued a diligent study with a view to developing a method for producing a porous cross-linked polymer material in a very short period of time in accordance with the principle of the HIPE method. It was consequently found that when a polyglycerine fatty acid ester is used as a surfactant and a consequently obtained HIPE is polymerized at a high temperature, a porous cross-linked polymer material suffering separation of waster only in small amount is obtained in a short time and a finally obtained porous cross-linked polymer material excels in absorption properties. This invention has been perfected based on this discovery. Specifically, this invention is aimed at providing the following item (1).

(1) In producing a porous cross-linked polymer by forming an HIPE and subsequently polymerizing the HIPE, a method for the production of a porous cross-linked polymer material which comprises a step of polymerizing the HIPE obtained in the presence of a polyglycerine fatty acid ester.

According to this invention, the HIPE can be polymerized in such a heretofore unforeseeable short span of time as not more than one hour, preferably not more than 30 minutes and the porous cross-linked polymer material excelling in absorbing properties can be efficiently produced.

Figure 1:
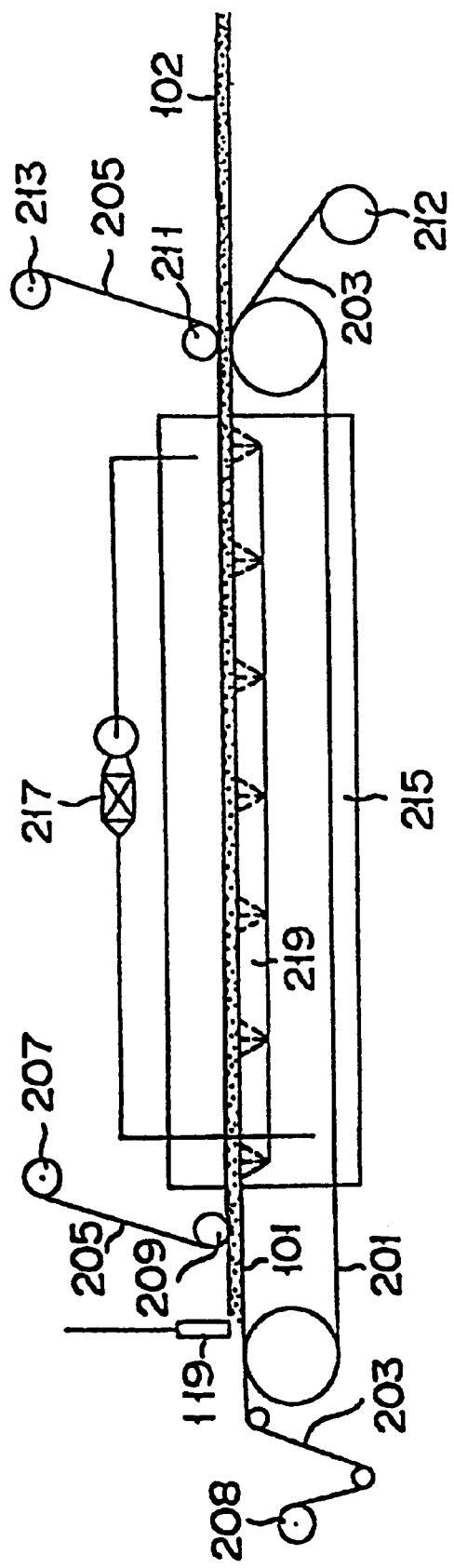
FIG. 1 is a schematic side view illustrating an apparatus adapted for the production of a porous cross-linked polymer and used in the working examples.

101 . . . HIPE, 102 . . . porous cross-linked polymer, 119 . . . HIPE supplying device unit, 201 . . . endless belt type conveyr (furnished with drive conveying device), 203, 205 . . . sheet material, 207, 208 . . . unwinding roller, 209, 211 . . . roller, 212, 213 . . . rewinding roller, 215 . . . polymerization furnace, 217 . . . heating means, 219 . . . hot water shower.

BEST MODE OF EMBODYING THE INVENTION

This invention, in producing a porous cross-linked polymer by forming an HIPE and subsequently polymerizing the HIPE, primarily concerns a method for producing a porous cross-linked polymer material which comprises a step of polymerizing the HIPE obtained in the presence of a polyglycerine fatty acid ester.

Here, one example of the mode of continuously producing a porous cross-linked polymer material by polymerizing an HIPE will be described below with the aid of a flow of FIG. 1. As illustrated in FIG. 1, an HIPE 101 is continuously supplied from an HIPE supplying part 119 onto a sheet material 203 and formed in the shape of a sheet by adjusting the set height of a roller 209. The rotating speeds of an unwinding and a rewinding roller 208, 212 are so controlled as to synchronize the sheet material 203 with a conveyor belt 201. A sheet material 205, while continuing application of tension to the HIPE 101 so as to fix the thickness thereof, has the rotating speed thereof controlled with the roller 209 and a roller 211 and an unwinding and a rewinding roller 207 and 213. In a polymerization furnace 215, the HIPE 101 is polymerized to afford a porous cross-linked polymer material 102 by the operation of a heating means 219 formed of a hot water shower and disposed below the conveyor belt 201 and a heating means 217 formed of a hot wind circulating device and disposed above the conveyor belt 201. Then, by peeling the upper and lower sheet materials 203 and 205, the porous cross-linked polymer material 102 can be obtained. Now, this invention will be described in detail below.

I. Preparation of HIPE
(1) Raw Materials Used for HIPE

The raw materials to be used for an HIPE are only required to contain (a) a polymerizing monomer, (b) a cross-linking monomer, and (c) a suffactant, namely a polyglycerine fatty acid ester, as an essential component for forming an oil phase and (d) water as an essential component for forming a water phase. They may further contain, when necessary, (e) a polymerization initiator, (f) a salt, and (g) other additives as arbitrary component for forming the oil phase and/or the water phase.

(a) Polymerizing Monomer

The monomer composition essential for the composition of the HIPE mentioned above is a polymerizing monomer possessing one polymerizing unsaturated group in the molecule thereof. Though it does not need to be particularly discriminated but has only to be capable of being polymerized in a dispersion or an HIPE and allowed to form an emulsion consequently. It preferably contains a (meth) acrylic ester at least partly, more preferably contains not less than 20 mass % of the (meth)acrylic ester, and particularly preferably contains not less than 35 mass % of the (meth) acrylic ester. When the (meth)acrylic ester is contained as a polymerizing monomer possessing one polymerizing unsaturated group in the molecule thereof proves advantageous because the produced porous cross-linked polymer abounds in flexibility and toughness.

As concrete examples of the polymerizable monomer which is used effectively in this invention, allylene monomers such as styrene; monoalkylene allylene monomers such as ethyl styrene, α-methyl styrene, vinyl toluene, and vinyl ethyl benzene; (meth)acrylic esters such as methyl (meth)acrylate, ethyl (meth)acrylate, butyl (meth)acrylate, isobutyl (meth)acrylate, isodecyl (meth)acrylate, 2-ethylhexyl (meth)acrylate, lauryl (meth)acrylate, stearyl (meth)acrylate, cyclohexyl (meth)acrylate, and benzyl (meth)acrylate; chlorine-containing monomers such as vinyl chloride, vinylidene chloride, and chloromethyl styrene; acrylonitrile compounds such as acrylonitrile and methacrylonitrile; and vinyl acetate, vinyl propionate, N-octadecyl acrylamide, ethylene, propylene, and butene may be cited. These polymerizable monomers may be used either singly or in the form of a combination of two or more members.

The content of the polymerizing monomer is preferred to be in the range of 10–99.9 mass %, based on the total mass of the monomer composition consisting of the polymerizing monomer and across-linking monomer. The reason for this range is that the produced porous cross-lined polymer is enabled to acquire pores of minute diameters. The range is more preferably 30–99 mass % and particularly preferably 30–70 mass %. If the content of the polymerizing monomer is less than 10 mass %, the produced porous cross-linked polymer will be possibly friable and deficient in water absorption ratio. Conversely, if the content of the polymerizing monomer exceeds 99.9 mass %, the porous cross-linked polymer consequently produced will be possibly deficient in strength and elastic recovery power and incapable of securing sufficient amount of water absorbed and sufficient velocity of water absorption.

(b) Cross-linking Monomer

The other monomer composition essential for the composition of the HIPE mentioned above is a cross-linking monomer possessing at least two polymerizing unsaturated groups in the molecule thereof. Similarly to the polymerizing monomer mentioned above, it does not need to be particularly discriminated but has only to be capable of being polymerized in a dispersion or a water-in-oil type high internal phase emulsion and allowed to form an emulsion consequently.

As concrete examples of the cross-linking monomer which is. effectively usable herein, aromatic monomers such as divinyl benzene, trivinyl benzene, divinyl toluene, divinyl xylene, p-ethyl-vinyl benzene, divinyl naphthalene, divinyl alkyl benzenes, divinyl phenanthrene, divinyl biphenyl, divinyl diphenyl methane, divinyl benzyl, divinyl phenyl ether, and divinyl diphenyl sulfide; oxygen-containing monomers such as divinyl furan; sulfur-containing monomers such as divinyl sulfide and divinyl sulfone; aliphatic monomers such as butadiene, isoprene, and pentadiene; and esters of polyhydric alcohols with acrylic acid or methacrylic acid such as ethylene glycol di(meth)acrylate, diethylene glycol di(meth)acrylate, triethylene glycol di(meth) acrylate, polyethylene glycol di(meth)acrylate, 1,3-butane diol di(meth)acrylate, 1,4-butane diol di(meth)acrylate, 1,6-hexane diol di(meth)acrylate, octane diol di(meth)acrylate, decane diol di(meth)acrylate, trimethylol propane di(meth) acrylate, trimethylol propane tri(meth)acrylate, pentaerythritol di(meth)acrylate, pentaerythritol tri(meth)acrylate, pentaerythritol tetra(meth)acrylate, dipentaerythritol di(meth) acrylate, dipentaerythritol tri(meth)acrylate, dipentaerythritol tetra(meth)acrylate, N,N'-methylene bis (meth)acryl amide, triallyl isocyanurate, triallyl amine, tetraallyloxy ethane, hydroquinone, catechol, resorcinol, and sorbitol may be cited. These cross-linking monomers may be used either singly or in the form of a combination of two or more members.

The content of the cross-linking monomer is properly in the range of 0.1–90 mass %, preferably 1–70 mass %, and particularly preferably 30–70 mass %, based on the total mass of the monomer composition consisting of the polymerizing monomer mentioned above and the cross-linking monomer mentioned above. If the content of the cross-linking monomer is less than 0.1 mass %, the produced porous cross-linked polymer will possibly be deficient in strength and elastic recovery force, unable to effect absorption sufficiently per unit volume or unit mass, and incapable of securing absorption in a sufficient amount at a sufficient velocity. Conversely, if the content of the cross-linking monomer exceeds 90 mass %, the porous cross-linked polymer produced consequently will possibly be friable and deficient in water absorption ratio.

(c) Surfactant

The surfactant mentioned above is a polyglycerine fatty acid ester. This polyglycerine fatty acid ester does not need to be particularly restricted but is only required to be such that the polyglycerine forming the ester is an oligomer of not less than 3 glycerine units. The demarcation of not less than 3 glycerine units is based on the ascertainment that while the use of a fatty acid ester of glycerin alone or glycerin dimer produces no sufficient emulsifying power, the use of a fatty acid ester of an oligomer of three or more glycerin units allows an HIPE to be stabilized even at high temperatures and consequently warrants production of a polymer entailing separation of water only in a small amount and excelling in the ratio of free swelling. The fatty acid is only required to be bound at a rate of not less than one molecule to the polyglycerine and does not need to be bound to all the hydroxyl groups. The size of the polyglycerine is preferably an oligomer in the range of 3–10 glycirine units, more preferably in the range of 6–10 glycerine units. The fatty acid forming the polyglycerine fatty acid ester is preferably a fatty acid of 6–28 carbon atoms, more preferably a fatty acid of 12–24 carbon atoms, and particularly preferably a fatty acid of 16–20 carbon atoms. Such a fatty acid may be possessed of a branched chain. The fatty acid may be a saturated fatty acid or an unsaturated fatty acid so long as the number of carbon atoms falls in the range mentioned above. The preferred linear chain fatty acids include lauric acid, myristic acid, palmitic acid, stearic acid, oleic acid, docosanoic acid, tetracosanoic acid, and ricinoleic acid, for example. The preferred branched chain fatty acids include isostearic acid, for example.

As concrete examples of the polyglycerine fatty acid esters which are usable in this invention, tetraglyceryl monostearate, tetraglyceryl monooleate, tetraglyceryl tristearate, tetraglyceryl pentastearate, tetraglyceryl pentaoleate, tetraglyceryl monolaurate, tetraglyceryl monomyristate, hexaglyceryl monostearate, hexaglyceryl monooleate, hexaglyceryl tristearate, hexaglyceryl pentastearate, hexaglyceryl pentaoleate, hexaglyceryl polyricinolate, decaglyceryl monolaurate, decaglyceryl monostearate, decaglyceryl monomyristate, decaglyceryl monoiso-stearate, decaglyceryl monooleate, decaglycryl monolinolate, decaglyceryl distearate, decaglyceryl diisostearate, decaglyceryl tristearate, decaglyceryl trioleate, decaglyceryl trioleate, decaglyceryl pentastearate, decaglyceryl pentaisostearate, decaglyceryl pentaoleate, decaglyceryl heptastearate, decaglyceryl heptaoleate, decaglyceryl decastearate, decaglyceryl decaisostearate, and decaglyceryl decaoleate may be cited. This invention particularly prefers to use decaglyceryl trioleate. Two or more of these olyglycerin fatty acid esters may be used in combination. Such combined use possibly results in improving a given HIPE in stability.

As the surfactant, such a polyglycerine fatty acid ester may be used alone or in combination with some other surfactant. When the polyglycerine fatty acid ester and other surfactant are used in combination, the ratio of the polyglycerine fatty acid ester to the whole surfactant is preferably not less than 50 mass. %, more preferably not less than 70 mass. %. As concrete examples of the surfactant which can be used in combination with the polyglycerine fatty acid ester, the nonionic surfactants, anionic surfactants, cationic surfactants, and amphoteric surfactants which are known to the art may be cited.

Among these surfactants, as concrete examples of the nonionic surfactant, nonyl phenol polyethylene oxide adduct; block polymer of ethylene oxide and propylene oxide; sorbitan fatty acid esters such as sorbitan monolaurate, sorbitan monomyristylate, sorbitan monopalmitate, sorbitan monostearate, sorbitan tristearate, sorbitan monooleate, sorbitan trioleate, sorbitan sesquioleate, and sorbitan distearate; glycerin fatty acid esters such as glycerol monostearate, glycerol monooleate, diglycerol monooleate, and self-emulsifying glycerol monostearate; polyoxyethylene alkyl ethers such as polyoxyethylene lauryl ether, polyoxyethylene cetyl ether, polyoxyethylene stearyl ether, polyoxyethylene oleyl ether, and polyoxyethylene higher alcohol ethers; polyoxyethylene alkylaryl ethers such as polyoxyethylene nonyl phenyl ether; polyoxyethylene sorbitan fatty acid esters such as polyoxyethylene sorbitan monolaurate, polyoxyethylene sorbitan monomyristylate, polyoxyethylene sorbitan monopalmitate, polyoxyethylene sorbitan monostearate, polyoxyethylene sorbitan tristearate, polyoxyethylene sorbitan monooleate, and polyoxyethylene sorbitan trioleate; polyoxyethylene sorbitol fatty acid esters such as tetraoleic acid polyoxyethylene sorbit; polyoxyethylene fatty acid esters such as polyethylene glycol monolaurate, polyethylene glycol monostearate, polyethylene glycol distearate, and polyethylene glycol monooleate; polyoxyethylene alkyl amines; hydrogenated polyoxyethylene castor oil; and alkyl alkanol amides may be cited. These nonionic surfactants having HLB values of not more than 10, more preferably in the range of 2–6, prove preferable. It is permissible to use two or more such nonionic surfactants in combination. The combined use possibly results in stabilizing the HIPE.

As concrete examples of the cationic surfactant, quaternary ammonium salts such as stearyl trimethyl ammonium chloride, ditallow dimethyl ammonium methyl sulfate, cetyl trimethyl ammonium chloride, distearyl dimethyl ammonium chloride, and alkylbenzyl dimethyl ammonium chloride; alkyl amine salts such as coconut amine acetate and stearyl amine acetate; alkyl betaines such as lauryl trimethyl ammonium chloride, lauryl betaine, stearyl betaine, and lauryl carboxymethyl hydroxyethyl imidazoliniumbetaine; and amine oxides such as lauryl dimethyl amine oxide may be cited. The use of the cationic surfactant can impart excellent antibacterial properties to the porous cross-linked polymer when the polymer is used for an absorbent material, for example.

The anionic surfactant of a kind possessing an anionic moiety and an oil-soluble moiety can be advantageously used. As concrete examples of anionic surfactant, such reactive anion emulsifiers possessed of a double bond as, for example, alkyl sulfates such as sodium dodecyl sulfate, potassium dodecyl sulfate, and ammonium alkyl sulfate; sodium dodecyl polyglycol ether sulfate; sodium sulforicinoate; alkyl sulfonates such as sulfonated paraffin salts; sodium dodecyl benzene sulfonate, alkyl sulfonates such as alkali metal sulfates of alkali phenol hydroxyethylene; higher alkyl naphthalene sulfonates; fatty acid salts such as naphthalene sulfonic acid formalin condensate, sodium laureate, triethanol amine oleate, and triethanol amine apiate; polyoxyalkyl ether sulfuric esters; sulfuric esters of polyoxyethylene carboxylic ester and polyoxyethylene phenyl ether sulfuric esters; succinic acid dialkyl ester sulfonates; and polyoxy ethylene alkyl aryl sulfates may be cited. An HIPE may be prepared by using an anionic surfactant in combination with a cationic surfactant.

The combined use of the nonionic surfactant and the cationic surfactant may possibly improve the HIPE in stability.

The content of the surfactant mentioned above is properly in the range of 1–30 mass parts, preferably 3–15 mass parts, based on 100 mass parts of the total mass of the monomer composition consisting of the polymerizing monomer and the cross-linking monomer. If the content of the surfactant is less than 1 mass part, the shortage will possibly deprive of the HIPE of stability of dispersion and prevent the surfactant from manifesting the effect inherent therein sufficiently. Conversely, if the content of the surf actant exceeds 30 mass parts, the excess will possibly render the produced porous cross-linked polymer unduly friable and fail to bring a proportionate addition to the effect thereof and do any good economically.

(d) Water

The water essential for the composition of the HIPE mentioned above may be city water, purified water ordeionized water. Alternatively, with a view to utilizing to advantage the waste water resulting from the production of the porous cross-linked polymer, this waste water may be adopted in its unmodified form or after undergoing a prescribed treatment.

The content of the water may be suitable selected, depending on the kind of use (such as, for example, an absorbent material, sound insulation material, or filter) for which the porous cross-linked polymer possessing continuous cells is intended. Since the hole ratio of the porous cross-linked polymer material is decided by varying the water phase/oil phase (W/O) ratio of the HIPE, the amount of water to be used is automatically decided by selecting the W/O ratio calculated to produce a hole ratio which conforms to the use and the purpose of the produced material.

(e) Polymerization Initiator

For the purpose of accomplishing the polymerization of an HIPE in a very short period of time as aimed at by this invention, it is advantageous to use a polymerization initiator. The polymerization initiator is only required to be suitable for use in the reversed phase emulsion polymerization. It is not discriminated between the water-soluble type and the oil-soluble type.

As concrete examples of the water-soluble polymerization initiator which is used effectively herein, azo compounds such as 2,2'-azobis(2-amidinopropane) dihydrochloride; persulfates such as ammoniumpersulfate, potassiumpersulfate, and sodium persulfate; peroxides such as potassiumperacetate, sodiumperacetate, sodiumpercarbonate, potassiumperacetate may be cited. As concrete example of the oil-soluble polymerization initiator which is used effectively herein, peroxide such as, cumenehydroperoxide, t-butylhydroperoxide, t-butylperoxide-2-ethylhexyanoate di-t-butyl peroxide, diisopropyl benzene hydroperoxide, p-methane hydroperoxide, 1,1,3,3-tetramethylbutyl hydroperoxide, 2,5-dimethylhexane-2,5-dihydroperoxide, benzoyl peroxide, and methylethyl ketone peroxide may be cited. These polymerization initiators may be used either singly or in the form of a combination of two or more members.

Combined use of two or more kinds of polymerization initiator having different 10 hour half period temperatures, i.e. the temperatures at which the concentrations of the relevant initiators are halved in 10 hours proves advantageous. As a matter of course, it is permissible to use in combination the water-soluble polymerization initiator and the oil-soluble polymerization initiator.

The content of the polymerization initiator mentioned above is properly in the range of 0.05–25 mass parts, preferably 1.0–10 mass parts, based on 100 mass parts of the total mass of the monomer composition consisting of a polymerizing monomer and a cross-linking monomer, though it is variable with the combination of the polymer composition and the polymerization initiator. If the content of the polymerization initiator is less than 0.05 mass part, the shortage will be at a disadvantage in increasing the amount of the unaltered monomer component and consequently increasing the residual monomer content in the produced porous cross-linked polymer. Conversely, if the content of the polymerization initiator exceeds 25 mass parts, the excess will be at a disadvantage in rendering the polymerization difficult to control and degrading the mechanical property of the produced porous cross-linked polymer.

Alternatively, a redox polymerization initiator formed by combining the polymerization initiator mentioned above with a reducing agent may be used. In this case, the polymerization initiator to be used herein does not need to be discriminated between the water-soluble type and the oil-soluble type. It is permissible to use a water-soluble redox polymerization initiator and an oil-soluble redox polymerization initiator in combination.

In the reducing agents, as concrete examples of the water-soluble reducing agents, sodium hydrogen sulfite, potassium hydrogen sulfite, sodium thiosulfate, potassium thiosulfate, L-ascorbic acid, ferrous salts, formaldehyde sodiumsulfoxylate, glucose, dextrose, triethanol amine, and diathanol amine may be cited. As concrete examples of the oil-soluble reducing agent, dimethyl aniline, tin octylate, and cobalt naphthenate may be cited. These redox polymerization initiator type reducing agents may be used either singly or in the form of a mixture of two or more members.

The ratio of the reducing agent contained in the redox polymerization initiator mentioned above (mass ratio), i.e. the polymerization initiator (oxidizing agent)/reducing agent, is in the approximate range of 1/0.01–1/10, preferably 1/0.2–1/5.

The polymerization initiator (inclusive of the redox polymerization initiator) is only required to be present at least during the course of the polymerization of an HIPE. It may be added to the oil phase and/or the water phase ① prior to the formation of an HIPE, At simultaneously with the formation of an HIPE, or ② after the formation of an HIPE. In the case of the redox polymerization initiator, the polymerization initiator (oxidizing agent) and the reducing agent may be added at different times.

(f) Salt

The salt as an arbitrary component for the composition of the HIPE mentioned above may be used when it is necessary for improving the stability of the HIPE.

As concrete examples of the salt of this nature, halogenides, sulfates, nitrates, and other similar water-soluble salts of alkali metals and alkaline earth metals such as calcium chloride, sodium sulfate, sodium chloride, and magnesium sulfate may be cited. These salts may be used either singly or in the form of a combination of two or more members. Such a salt is preferred to be added in the water phase. Among other salts mentioned above, polyvalent metal salts prove particularly advantageous from the viewpoint of the stability of the HIPE during the course of polymerization.

The content of the salt mentioned above is proper in the range of 0.1–20 mass parts, preferably 0.5–10 mass parts, based on 100 mass parts. If the content of the salt exceeds 20 mass parts, the excess will be at a disadvantage in suffering the waste water squeezed out of the HIPE to contain the water in an unduly large amount, boosting the cost for the disposal of the waste water, failing to bring a proportional addition to the effect, and not doing any good economically. If the content is less than 0.1 mass part, the shortage will possibly prevent the effect of the addition of the salt from being fully manifested.

(g) Other Additive

Varying other additive which are capable of improving the conditions of production, the property of HIPE, and the performance of the porous cross-linked polymer by imparting the performance and the function of their own, they may be suitably used herein. For example, a base and/or a buffer may be added for the purpose of adjusting the pH value. The content of the other additive may be selected within such a range that the additive used may fully manifest the performance, function, and further the economy commensurate with the purpose of addition. As such additives, activated carbon, inorganic powder, organic powder, metallic powder, deodorant, antibacterial agent, antifungi agent, perfume and other highly polymerized compounds may be cited.

(2) Method for Preparation of HIPE

The method for production of the HIPE which can be used in this invention does not need to be particularly discriminated. Any of the methods for production of HIPE heretofore known to the art may be suitably used. A typical method for the production of interest will be specifically described below.

First, a polymerizing monomer, a cross-linking monomer, and a surfactant as essential components and further an oil-soluble polymerization initiator (inclusive of an oil-soluble redox polymerization initiator) and other additive as optional components for the formation of an oil phase prepared in respectively specified amounts mentioned above are stirred at a prescribed temperature to produce a homogeneous oil phase.

Meanwhile, water as an essential component and further a water-soluble polymerization initiator (inclusive of a water-soluble redox polymerization initiator), salts, and other additive as optional components for the formation of a water phase prepared in respectively specified amounts are stirred and heated to a prescribed temperature in the range of 30–95° C. to produce a homogeneous water phase.

Then, the oil phase which is the mixture of the monomer component, surf actant, etc. and the water phase which is the mixture of water, water-soluble salt, etc., both prepared as described above are joined, mixed and stirred efficiently for exertion of proper shearing force and induction of emulsification at the temperature for the formation of an HIPE (emulsifying temperature) which will be described specifically hereinbelow to accomplish stable preparation of an HIPE. As a means for stirring and mixing the water phase and the oil phase particularly for the table preparation of the HIPE, the method which comprises keeping the oil phase stirred and continuously adding the water phase to the stirred oil phase over a period of several minutes to some tens of minutes. Alternatively, the HIPE aimed at may be produced by stirring and mixing part of the water phase component and the oil phase component thereby forming an HIPE resembling yogurt and continuing the stirring and mixing operation while adding the remaining portion of the water phase component to the yogurt-like HIPE.

(3) Water Phase/oil Phase (W/O) Ratio

The water phase/oil phase (W/O) ratio (mass ratio) of the HIPE which is obtained as described above does not need to be particularly limited but may be properly selected to suit the purpose for which the porous cross-linked polymer material possessed of open cells is used (such as, for example, water absorbent, oil absorbent, sound insulating material, and filter). It is only required to be not less than 3/1 as specified above and is preferred to fall in the range of 10/1–250/1, particularly 10/1–100/1. If the W/O ratio is less than 3/1, the shortage will be possibly at a disadvantage in preventing the porous cross-linked polymer material from manifesting a fully satisfactory ability to absorb water and energy, lowering the degree of opening, and causing the surface of the produced porous cross-linked polymer material to suffer from unduly low degree of opening and fail to exhibit a fully satisfactory permeability to liquid. The hole ratio of the porous cross-linked polymer material is decided by varying the W/O ratio. Thus, the W/O ratio is preferred to be selected so as to impart to the produced porous cross-linked polymer material a hole ratio conforming to the use and the purpose. When the product is used as a varying absorbent material such as disposable diaper or sanitary article, for example, the W/O ratio is preferred to fall in the approximate range of 10/1–100/1. Incidentally, the HIPE which is obtained by stirring and mixing the water phase and the oil phase is generally a white highly viscous emulsion.

(4) Apparatus for Production of HIPE

The apparatus for the production of the HIPE mentioned above does not need to be particularly discriminated. Any of the apparatuses for the production of the porous cross-linked polymer material which have been heretofore known to the art may be used. For example, the stirring device (emulsifier) to be used for mixing and stirring the water phase and the oil phase may be selected from among the stirring devices and the kneading devices which have been heretofore known to the art. As concrete examples of the stirring device, stirring devices using vanes of the propeller type, the paddle type, and the turbine type, homomixers, line mixers, and pin mills may be cited.

(5) Forming Temperature of HIPE

The formation (emulsification) of an HIPE is generally carried out at a temperature exceeding 20° C. and approximating closely to the polymerization temperature. In order for the porous cross-linked polymer material to be obtained in a short time efficiently, it is important to form an HIPE at a high temperature approximating closely to the emulsification temperature. Because of the difficulty encountered in obtaining an HIPE by stable emulsification at an elevated temperature, it has been heretofore customary to form an HIPE in the neighborhood of room temperature and polymerize this HIPE at a temperature elevated by some tens of degrees C. Since the HIPE which contains water in a large amount has a large thermal capacity, the time required for the temperature elevation mentioned above forms a major cause for lowering the productivity of the porous cross-linked polymer material. Since the method of this invention is capable of stably forming an HIPE even at a high temperature, it can form the HIPE at a temperature equivalent to or near the polymerization temperature and can eliminate the defects of the conventional method. Specifically, the forming temperature of the HIPE is preferably in the range of 40–100° C., more preferably in the range of 70–100° C., and particularly preferably in the range of 80–100° C. It is commendable to form an HIPE aimed at by adjusting the temperature of an oil phase and/or a water phase in advance to a prescribed forming temperature (emulsifying temperature) and stirring and mixing the two phases till they are emulsified. In the preparation (formation) of the HIPE, however, since the water phase is in a large amount, it may be safely concluded preferable to have the temperature of at least the water phase adjusted to the prescribed forming temperature (emulsifying temperature).

II. Production of Porous Cross-linked Polymer Material (1) Addition of Polymerization Initiator (a) Time for Addition of Polymerization Initiator This invention contemplates ① adding a polymerization initiator to the water phase and/or the oil phase and mixing them prior to the formation of an HIPE, ② simultaneously adding the polymerization initiator with the formation of the HIPE, or ③ making this addition subsequently to the formation of the HIPE.

(b) Method for Addition of Polymerization Initiator

It is convenient to add preparatorily the polymerization initiator to the oil phase when the polymerization initiator or the reducing agent is an oil-soluble type or to the water phase when it is in a water-soluble type. Alternatively, the oil-soluble polymerization initiator (oxidizing agent) or the reducing agent may be added in an emulsified form, for example, to the water phase.

(c) Form of Use of Polymerization Initiator

The polymerization initiator may be used in an undiluted form, in the form of a solution in water or an organic solvent, or in the form of a dispersion. When the addition is made either simultaneously with or subsequently to the formation of the HIPE, it is important that the added polymerization initiator be quickly and homogeneously mixed with the HIPE for the purpose of avoiding the otherwise possible heterogeneous polymerization of the monomer component. Further, the HIPE which has been mixed with the polymerization initiator is quickly introduced into a polymerization vessel or a continuous polymerizing device as means for polymerization. It is commendable from this point of view to insert a path for the introduction of a polymerization initiator such as a reducing agent or an oxidizing agent in the path extending from the emulsifying device for preparing the HIPE through the polymerization vessel or the continuous polymerizing device, adding the polymerization initiator via the path to the HIPE, and mix them by means of a line mixer.

If the HIPE which contains the polymerization initiator has a small difference between the emulsifying temperature and the polymerizing temperature thereof, the closeness of the emulsifying temperature to the polymerizing temperature will possibly set the polymerizing monomer or the cross-linking monomer polymerizing during the course of the emulsification and suffer the resultant polymer to impair the stability of the produced HIPE. Thus, the method of adding the reducing agent or the oxidizing agent or other polymerization initiator to the HIPE immediately prior to the polymerization, i.e. the method of ② or ③ mentioned above, proves advantageous.

The amount of the polymerization initiator to be used herein equals that in the method described above under the title of the method for preparation of HIPE.

(2) Polymerization of HIPE (a) Method for Polymerization

Next, the method for polymerizing the HIPE mentioned above does not need to be particularly restricted but may be properly selected from among the known methods for the polymerization of an HIPE. Generally, the HIPE is polymerized by the method of stationary polymerization under the conditions which are incapable of breaking the structure of water drops highly dispersed in the oil of the HIPE. The polymerization in this case may be performed in a batch pattern which consists in polymerizing one batch after another of HIPE or in a continuous pattern which consists in continuously feeding an HIPE and superposing one layer on another of the HIPE.

To harness the effect of quick polymerization at an elevated temperature which characterizes this invention, the polymerization of an HIPE is carried out more preferably by the continuous method than the batch method because the former method is capable of elevating the temperature of the HIPE easily. It is advantageous to adopt, for example, the method of continuous polymerization which consists in continuously forming an HIPE in the form of a layer on a belt in motion and polymerizing the layer of the HIPE. To be specific, for the continuous polymerization of a porous cross-linked polymer in the shape of a sheet, a method which comprises continuously supplying an HIPE onto the belt in motion of a belt conveyor so constructed as to have the surface thereof heated with a heating device and forming the HIPE in the shape of a flat and smooth sheet and polymerizing it is available, for example. When the surface of the conveyor which is fated to contact the emulsion is flat and smooth, a continuous sheet of a necessary thickness may be obtained by supplying the HIPE in a prescribed thickness onto the belt. Since this invention is capable of preparing an HIPE at a high temperature, the method of continuous polymerization which continuously polymerizes an HIPE is at an advantage in heightening the efficiency of production and permitting the effect of shortening the polymerization time to be utilized most effectively. Moreover, the act of polymerizing an HIPE in the form of a sheet and meantime conveying it horizontally proves to be an advantageous operation even in consideration of the fact that the HIPE is possessed of a comparatively brittle quality which permits the oil phase and the water phase thereof to be readily deflected and separated in the vertical direction. Even in this case, it is permissible to polymerize an HIPE in the form of a block or a sheet and then fabricate the block or the sheet in any arbitrary form by cutting it into slices each measuring 5 mm in thickness, for example.

(b) Polymerization Temperature

The polymerization temperature of the HIPE is preferred to be as high as permissible for the purpose of enabling the polymerization to be completed in a short time. Since the method of this invention is incapable of impairing the stability of the HIPE even at high temperatures, the polymerization temperature can be selected more freely than when a known emulsifier is used. The polymerization temperature is preferably in the range of 70–150° C., more preferably in the range of 75–110° C., and particularly preferably in the range of 85–100° C. Further, the polymerization temperature may be varied in two stages or in more stages during the course of the polymerization.

(c) Polymerization Time

The polymerization time for the HIPE in this invention is in the range of 1 minute–20 hours, preferably within one hour, more preferably within 30 minutes, and particularly preferably in the range of 1–20 minutes. If the polymerization time exceeds 20 hours, the excess will be possibly at a disadvantage commercially in degrading the productivity. Conversely, if the polymerization time is less than 1 minute, the shortage will possibly prevent the porous cross-linked polymer material from acquiring sufficient strength. Of course, this invention does exclude the use of a longer polymerization time than the range mentioned above.

(d) Polymerizing Device

The polymerizing device which can be used for this invention does not need to be particularly restricted. From the known chemical devices, a device which fits the relevant method of polymerization may be selected and used or, when necessary, may be used as suitably modified. For the batch polymerization, a polymerization vessel so shaped as to fit the purpose of use of the produced polymer can be used. For the continuous polymerization, a belt conveyor type continuous polymerizing device furnished with a compressing roller can be used. Some of these devices are provided with a heating means and a controlling means suitable for the relevant method of polymerization such as, for example, an active thermal energy ray such as microwave or near infrared ray which can utilize a radiation energy or a heating means capable of quickly elevating temperature with a thermal medium such as hot water or hot wind, for example. Such additional means need not be limited to those mentioned above. In the case of performing batch polymerization, the upper and lower surfaces of the mass of the HIPE placed in the polymerization vessel are preferred not to be exposed to the ambient air, particularly to the oxygen contained in the ambient air, between the time the polymerization is initiated and the time it is completed. These surface parts abhor the ambient air because they are capable of strictly securing the open cell structure. In the case of the belt conveyor type continuous polymerization, for example, it is commendable to spread a PET film on the belt conveyor serving the purpose of supplying an HIPE and, after the supply of the HIPE, immediately overlay the HIPE with a sealing material such as a PET film to seal the HIPE from the ambient air. These polymerizing devices do not need to be discriminated on account of the kind of material to be used therefore. They may be made of such metals as aluminum, iron, and stainless steel, such synthetic resins as polyethylene, polypropylene, fluorine resin, polyvinyl chloride, and unsaturated polyester resin, and such fiber-reinforced resins as the synthetic resins mentioned above reinforced with glass fibers or carbon fibers, for example.

(3) Step of Aftertreatment (Conversion into Finished Product) After Formation of Porous Cross-linked Polymer Material (a) Dehydration The porous cross-linked polymer material formed in consequence of the completion of polymerization is normally dehydrated by compression, aspiration under reduced pressure, or the combination thereof. By this dehydration, generally 50–98% of the water used is removed and the remainder thereof is left adhering to the porous cross-linked polymer material.

The ratio of dehydration is properly set to suit the purpose for which the produced porous cross-linked polymer material is used. Generally, the water content in the porous cross-linked polymer material in a perfectly dried state is set at a level in the range of 1–10 g, preferably 1–5 g, per g of the polymer material.

(b) Compression

The porous cross-linked polymer of this invention can be obtained in a form compressed to one of several divisions of the original thickness. The compressed sheet has a smaller inner volume than the original porous cross-linked polymer and permits a decrease in the cost of transportation or storage. The porous cross-linked polymer in the compressed state is characterized by being disposed to absorb water when exposed to a large volume of water and resume the original thickness and exhibiting the ability to absorb water at a higher speed than the original polymer.

From the viewpoint of saving the space for transportation or storage and facilitating the handling, it is effective to compress the polymer to not more than ½ of the original thickness. Preferably, the compression is made to not more than ¼ of the original thickness.

(c) Cleaning

For the purpose of improving the surface condition of the porous cross-linked polymer, the porous cross-linked polymer may be washed with pure water, an aqueous solution containing an arbitrary additive, or a solvent.

(d) Drying

The porous cross-linked polymer obtained by the preceding steps, when necessary, may be dried by heating as with hot air or microwaves or may be moistened for adjustment of the water content.

(e) Cutting

The porous cross-linked polymer obtained by the preceding steps, when necessary, may be cut in expected shape and size and fabricated into a finished product fitting the purpose of use.

(f) Impregnation

The polymer may be endowed with functionality by being impregnated with a detergent or an aromatic agent.

EXPERIMENTS

Now, this invention will be described more specifically below with reference to working example. The properties of the porous cross-linked polymer material reported in these working examples were determined and rated as follows.

(1) Ratio of Water Separation

The ratio of water separation (%) was determined by recovering the separated water occurring after the polymerization by decantation from the polymerization vessel, weighing the recovered water, and performing calculation of the following formula 1 using the results of the weighing.

Ratio of water separation (%)=(Mass of separated water/mass of water phase used)×100   Formula 1

(2) Ratio of Free Swelling

The ratio of free swelling (g/g) of a given porous cross-linked polymer was determined by cutting a sample measuring a square of 1 cm from the polymer, drying and weighing this sample in advance, immersing the sample in an ample amount of purified water, allowing the sample now swelled with the absorbed purified water to stand at rest for 30 seconds on a glass filter measuring 120 m min diameter and 5 m min thickness (made by Duran Corp. and sold under the product code of #0), draining the wet sample, measuring the impregnated sample for weight, and calculating the following formula 2 using the results of the measurement.

Ratio of free swelling (g/g)=((Mass of sample after absorbing water-mass of sample before absorbing water)/(Mass of sample before absorbing water)   Formula 2

EXAMPLE 1

The water phase to be used for the process of continuous emulsification for the formation of an HIPE was prepared by dissolving 36.3 kg of anhydrous potassium chloride and 568 g of potassium persulfate in 378 liters of purified water. Then, the water phase was obtained by adding 960 g of decaglyceryl trioleate to a mixture of 1600 g of styrene. The water phase was supplied at a temperature of 80° C. at a flow volume of 56.5 cm³/s and the oil phase was supplied at a temperature of 22° C. at a flow volume of 1.13 g/s separately to a dynamic mixing device and these two phases in the dynamic mixing device were thoroughly mixed and partly recycled with a pin impeller rotating at 1800 rpm. The resultant HIPE of a temperature of 79° C. was cast at a flow volume of 57.6 cm³/s into the gap between the PET films attached to a device illustrated in FIG. 1. The cast HIPE, after having the thickness thereof adjusted to 5 mm, was moved on an oblong plate, passed at a transferring speed of 15 cm/min. through a polymerization furnace set in advance at an internal temperature of 80° C., and polymerized for 60 minutes to obtain a polymer. No sign of water separation was observed on this polymer. The polymer thus obtained was dehydrated and dried to afford a porous cross-linked polymer material. This porous cross-linked polymer material exhibited such a high ratio of free swelling as 47 g/g, indicating that it had a satisfactory water absorbing property.

EXAMPLE 2

An HIPE was obtained by following the procedure of Example 1 while using a water phase of a temperature of 85° C. in the place of the water phase of a temperature of 80° C. The HIPE thus obtained was cast into the gap between the PET films attached to the device of FIG. 1. The cast HIPE, after having the thickness thereof adjusted to 5 mm, was moved on an oblong plate, passed at a transferring speed of 1.25 m/min. through a polymerization furnace set in advance at an inner temperature of 95° C., and polymerized for 8 minutes to afford a polymer. No sign of water separation was observed on this polymer. The polymer thus obtained was dehydrated and dried to obtain a porous cross-linked polymer material. This porous cross-linked polymer material exhibited such a high ratio of free swelling as 47 g/g, indicating that it had a satisfactory water absorbing property.

EXAMPLE 3

An HIPE was obtained by following the procedure of Example 1 while using hexaglyceryl monooleate in the place of the decaglyceryl trioleate. The HIPE thus obtained was cast into the gap between the PET films attached to the device of FIG. 1. The cast HIPE, after having the thickness thereof adjusted to 5 mm, was moved on an oblong plate, passed at a transferring speed of 30 cm/min. through a polymerization furnace set in advance at an inner temperature of 80° C., and polymerized for 30 min. to afford a polymer. No sign of water separation was observed on this polymer. The polymer thus obtained was dehydrated and dried to obtain a porous cross-linked polymer material. This porous cross-linked polymer material exhibited such a high ratio of free swelling as 47 g/g, indicating that it had a satisfactory water absorbing property.

EXAMPLE 4

An HIPE was obtained by following the procedure of Example 1. In a plastic container having an inner volume of 600 cc, 250 g the HIPE thus obtained was placed, sealed by closing the container with a stopper, and polymerized by being kept immersed as held in the container in a water bath set at 80° C. for 60 minutes to afford a polymer. No sign of water separation was observed on the polymer. The polymer thus obtained was sliced into pieces 5 mm in thickness and the sliced pieces were dehydrated and dried to afford a porous cross-linked polymer material. This porous cross-linked polymer material exhibited such a high ratio of free swelling as 47 g/g, indicating that it had a satisfactory water absorbing property.

COMPARATIVE EXAMPLE 1

An HIPE was obtained by following the procedure of Example 1 while using glyceryl monooleate in the place of the decaglyceryl trioleate. The HIPE thus obtained was cast into the gap between the PET films attached to the device of FIG. 1. The cast HIPE, after having the thickness thereof adjusted to 5 mm, was moved on an oblong plate, passed at a transferring speed of 15 cm/min. through a polymerization furnace set in advance at an inner temperature of 80° C., and polymerized for 60 min. to afford a polymer. A sign of water separation was observed on this polymer. The polymer thus obtained was dehydrated and dried to obtain a porous cross-linked polymer material. This porous cross-linked polymer material exhibited such a low ratio of free swelling as 30 g/g, indicating that it had an inferior water absorbing property.

COMPARATIVE EXAMPLE 2

An HIPE was obtained by following the procedure of Example 1 while using glyceryl monooleate in the place of the decaglyceryl trioleate. In a plastic container having an inner volume of 600 cc, 250 g the HIPE thus obtained was placed, sealed by closing the container with a stopper, and polymerized by being kept immersed as held in the container in a water bath set at 80° C. for 60 minutes to afford a polymer. A sign of water separation was observed on the polymer. The ratio of the water separation was found to be 35%. The polymer thus obtained was sliced into pieces 5 mm in thickness and the sliced pieces were dehydrated and dried to afford a porous cross-linked polymer material. This porous cross-linked polymer material exhibited such a low ratio of free swelling as 30 g/g, indicating that it had an inferior water absorbing property.

COMPARATIVE EXAMPLE 3

An HIPE was obtained by following the procedure of Example 1 while using diglyceryl monooleate in the place of the decaglyceryl trioleate. In a plastic container having an inner volume of 600 cc, 250 g the HIPE thus obtained was placed, sealed by closing the container with a stopper, and polymerized by being kept immersed as held in the container in a water bath set at 80° C. for 60 minutes to afford a polymer. A sign of water separation was observed on the polymer. The ratio of the water separation was found to be 15%. The polymer thus obtained was sliced into pieces 5 mm in thickness and the sliced pieces were dehydrated and dried to afford a porous cross-linked polymer material. This porous cross-linked polymer material exhibited such a low ratio of free swelling as 40 g/g, indicating that it had an inferior water absorbing property.

Industrial Applicability

According to this invention, the HIPE can be polymerized in such a heretofore unforeseeable short span of time as not more than one hour, preferably not more than 30 minutes and the porous cross-linked polymer material excelling in absorbing properties can be efficiently produced.

What is claimed is:

1. In producing a porous cross-linked polymer by forming a water-in-oil type high internal phase emulsion and subsequently polymerizing the emulsion, a method for the production of a porous cross-linked polymer material which comprises a step of polymerizing a water-in-oil type high internal phase emulsion obtained in the presence of a polyglycerine fatty acid ester.

2. A method according to claim 1, wherein the polyglycerine forming the polyglycerine fatty acid ester is an oligomer of 3–10 glycerine units.

* * * * *